US008799858B2

(12) United States Patent
Martinez Canedo et al.

(10) Patent No.: US 8,799,858 B2
(45) Date of Patent: Aug. 5, 2014

(54) EFFICIENT EXECUTION OF HUMAN MACHINE INTERFACE APPLICATIONS IN A HETEROGENEOUS MULTIPROCESSOR ENVIRONMENT

(71) Applicants: Arquimedes Martinez Canedo, Princeton, NJ (US); Sven Hermann, Princeton Junction, NJ (US); Lingyun Max Wang, Princeton, NJ (US)

(72) Inventors: Arquimedes Martinez Canedo, Princeton, NJ (US); Sven Hermann, Princeton Junction, NJ (US); Lingyun Max Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 13/714,969

(22) Filed: Dec. 14, 2012

(65) Prior Publication Data

US 2014/0173558 A1 Jun. 19, 2014

(51) Int. Cl.
*G06F 9/44* (2006.01)

(52) U.S. Cl.
USPC .......................... 717/121; 717/107; 717/120

(58) Field of Classification Search
USPC ........... 717/113, 120–123, 104–109; 715/700
IPC ............................................... G06F 2219/3212
See application file for complete search history.

(56) References Cited

U.S. PATENT DOCUMENTS

| | | | |
|---|---|---|---|
| 6,430,609 B1 * | 8/2002 | Dewhurst et al. | 709/220 |
| 6,577,323 B1 * | 6/2003 | Jamieson et al. | 715/700 |
| 6,904,387 B2 | 6/2005 | Melzer | |
| 6,981,242 B2 * | 12/2005 | Lehmeier et al. | 717/122 |
| 7,350,188 B2 * | 3/2008 | Schulz | 717/104 |
| 7,444,188 B2 | 10/2008 | De Meyer et al. | |
| 7,523,083 B2 | 4/2009 | Bromley et al. | |
| 7,581,207 B2 * | 8/2009 | Bolder et al. | 717/122 |
| 7,624,375 B2 * | 11/2009 | Santori et al. | 717/121 |
| 7,661,088 B2 * | 2/2010 | Burke | 717/105 |
| 7,913,228 B2 * | 3/2011 | Ericsson et al. | 717/123 |
| 7,954,084 B2 * | 5/2011 | Arcaro et al. | 717/108 |
| 8,028,275 B2 * | 9/2011 | Eldridge et al. | 717/121 |

(Continued)

FOREIGN PATENT DOCUMENTS

WO 2012112302 A2 8/2012

OTHER PUBLICATIONS

Ahmed, "Intelligent Human Machine Interface Design for Advanced Product Life Cycle Management Systems", ACM, pp. 1-4, 2009.*

(Continued)

*Primary Examiner* — Anil Khatri (57) ABSTRACT

An arrangement is proposed for creating and executing human-machine interface (HMI) applications in various heterogeneous computing and communication environments. The arrangement includes an engineering system for designing HMI applications based upon a library of known HMI elements, a runtime system for determining an optimum configuration for executing the designed HMI applications and a knowledge repository that communicates with both the engineering system and the runtime system. The knowledge repository stores information related to various ones of the known HMI elements, as well as information created by application developers and information generated during execution of an HMI application by the runtime system. Thus, the knowledge repository can interact with the engineering system for updating information regarding selected elements and interacting with the runtime system to collect execution information for use in subsequent application developments.

9 Claims, 7 Drawing Sheets

(56) References Cited

U.S. PATENT DOCUMENTS

| | | | |
|---|---|---|---|
| 8,095,909 B2 * | 1/2012 | Eilam et al. | 717/104 |
| 8,132,149 B2 * | 3/2012 | Shenfield et al. | 717/107 |
| 8,181,157 B2 * | 5/2012 | Ericsson et al. | 717/123 |
| 8,359,573 B2 * | 1/2013 | Chouinard et al. | 717/120 |
| 8,407,661 B2 * | 3/2013 | Wang et al. | 717/100 |
| 8,484,615 B2 * | 7/2013 | Cramb et al. | 717/120 |
| 8,566,780 B2 * | 10/2013 | Tolskyakov et al. | 717/104 |
| 8,726,236 B2 * | 5/2014 | Coldicott et al. | 717/120 |
| 2004/0098358 A1 | 5/2004 | Roediger | |
| 2006/0206827 A1 | 9/2006 | DeWitt | |
| 2007/0260982 A1 | 11/2007 | Wayland et al. | |
| 2010/0023141 A1 | 1/2010 | Wang et al. | |
| 2011/0046754 A1 | 2/2011 | Bromley et al. | |
| 2011/0093800 A1 | 4/2011 | Gottwald et al. | |

OTHER PUBLICATIONS

Draper et al, "Software Engineering for User Interfaces", IEEE, pp. 214-220, 1984.*

Marsic, "DISCIPLE: A Framework for Multimodal Collaboration in Heterogeneous Environments", ACM, pp. 1-6, 1999.*

Khare et al, "An Empirical Study on Using Hidden Markov Model for Search Interface Segmentation", ACM, pp. 17-26, 2009.*

PCT International Search Report mailed Apr. 14, 2014 corresponding to EP International Application No. EP 13195410.9 filed Dec. 3, 2012 (8 pages).

Van Dyk D. et al; "HOLEI: A collection of libraries for numerical computations targeting multiple processor architectures"; Computer Physics Communication, Elsevier Science Publishers B. V., Amsterdam; vol. 180; No. 12; pp. 2534-2543; ISSN: 010-4655; DOI: 10.1016/J.CPC.2009.04.018; XP026746275; 2009; Dec. 1, 2009.

* cited by examiner

EFFICIENT EXECUTION OF HUMAN MACHINE INTERFACE APPLICATIONS IN A HETEROGENEOUS MULTIPROCESSOR ENVIRONMENT

TECHNICAL FIELD

The present invention discloses a system, method and program for improving the efficiency of executing human-machine interface (HMI) applications within a heterogeneous environment that may include different types of processors and communication elements.

BACKGROUND OF THE INVENTION

In today's world of complex industrial systems, human-machine interface (HMI) devices are utilized to provide a means for personnel to monitor and control various aspects of an industrial plant. Activities such as monitoring settings for temperatures and pressures, starting and stopping processes, reviewing sensor readings and setting actuator values and the like may all be controlled through HMI devices. Other operations also may fall within the purview of the industrial control personnel. An HMI device is a computer-controlled component that necessarily requires the utilization of various graphical visualizations (providing a graphical user interface, or GUI, to the operating personnel), and must be responsive to inputs from the personnel. Given the industrial environment within which these HMI devices are generally used, their computer-based processes need to operate in real time, recognize alarm conditions, and continue to operate in relatively extreme environments (e.g., high temperature).

At this point in time, HMI devices have been based upon the utilization a conventional, single-core multiprocessor as the main computing engine for the device, with HMI application developers using known HMI elements to construct the applications as required.

Along a separate development path, increases in processing capability have advanced in recent years by creating multi-core processors—starting with dual-core configurations where two separate processors were integrated within a single integrated circuit. Today, these processors, which are hereinafter referred to at times as "multiprocessors" are configured in a variety of different forms: a single processor with multiple cores, multiple single-core processors, a "many" core processor (which embodies multiple multi-core processors) or any combination of the above.

A "heterogeneous" multiprocessor environment, for the purposes of the present invention, is therefore intended to define a system where the multiple cores forming the complete suite of processing capability may comprise different types of processors, each with its own set of operating parameters such as size of processing core(s), speed, throughput, etc.

Multiprocessors (both central processing units (CPUs) and graphics processing units (GPUs) are becoming the standard computing element in modern industrial computer systems, particularly as a result of their improved performance over conventional single-core processing arrangements. For example, compared to traditional single-core CPUs, a multiprocessor-based CPU is more power efficient and generating less heat. Therefore, cooling of a multiprocessor-based CPU is easier and less expensive that a counterpart single-processor CPU system sized to perform under the same conditions. Moreover, a multiprocessor-based CPU has the ability to process more instructions in a given period of time as a result of its parallel execution capability.

In order to best take advantage of the parallel execution properties of a multiprocessor system, an application programmer must be able to identify and define data-independent fragments of a program that may be simultaneously executed within different processing cores. While this principle is simple in concept, the ability to identify data-independent fragments is very difficult in practice, particularly for programs that need to run in real time, such as the HMI applications described above.

A graphical user interface (GUI) is a common example of an HMI application that has been difficult to execute across multiple processors as a result of the real-time requirements for these GUI operations. Moreover, parallel execution does not always lead to faster computations. In practice, an application programmer must also take into account the cost of synchronizing different processing units (perhaps operating at different rates) and communicating data from one processing unit to another. Indeed, the cost of communication can mitigate any performance gains that result from parallel execution and may, at times, be detrimental to the performance of the application.

In an attempt to solve this problem, software and hardware vendors have been able to accelerate the execution of some GUI primitive operations. Traditionally, these accelerated operations are implemented in libraries that the system executes in specialized hardware (as opposed to software). For example, video card vendors provide the libraries to execute common GUI operations in a GPU. Although hardware acceleration works well and reduces the execution time of some GUI operations, HMI applications cannot rely on these assumptions to meet their real-time deadlines, since acceleration libraries are necessarily hardware-specific and vary from system to system. That is, an HMI application cannot be developed on the assumption that all HMI systems which may desire to run the application being developed include hardware-accelerated libraries, since HMI systems are known to vary all the way from very high-end arrangements (e.g., with GPUs and 64-bit multi-core CPUs) to low-end systems (e.g., with minimal graphic capabilities, little or no memory, and 16-bit embedded processors).

Thus, it remains desirable to find a means other than hardware acceleration to improve the efficiency of HMI applications in a multiprocessor environment.

SUMMARY OF THE INVENTION

The need remaining in the art is addressed by the present invention, which relates to a system, method and program for improving the efficiency of executing human-machine interface (HMI) applications across a multiprocessor environment that may include different types of processors.

In accordance with the present invention, an HMI creation and execution architecture is provided that utilizes separate engineering and runtime systems, and further includes a "knowledge repository" that accumulates information regarding various HMI application elements. The knowledge repository interacts with both the HMI engineering system and the HMI runtime system through queries and updates to build a data set of information regarding the details of various HMI elements available for use by the engineering and runtime systems.

In one embodiment, the present invention takes the form of a system for creating and executing human-machine interface (HMI) applications in various heterogeneous computing and communication environments comprising an engineering system for designing an HMI application based upon a library of known HMI elements, a runtime system for determining an optimum configuration for executing the HMI application designed by the engineering system and a knowledge repository in communication with both the engineering system and the runtime system. In accordance with the present invention, the knowledge repository stores information related to various ones of the known HMI elements, as well as information created by application developers and information generated during execution of an HMI application by the runtime system. Thus, the knowledge repository can interact with the engineering system for updating information regarding selected elements and interacting with the runtime system to collect execution information for use in subsequent application developments.

BRIEF DESCRIPTION OF THE DRAWINGS

Referring now to the drawings.

DETAILED DESCRIPTION

As will be described in detail below, the present invention provides a system, method and program to create and execute HMI applications in a manner that effectively utilizes multiple heterogeneous computation and communication elements to provide real-time responses for GUI operations. The inventive system includes a "knowledge repository" that is accessible by application developers, engineering systems and runtime systems to collect and share information about various elements that are used in the formation of an HMI application. The sharing of this information between the three entities involved in the generation of HMI applications (development, engineering and execution) yields a program that is able to efficiently execute HMI applications in a heterogeneous environment—as well as in differently-configured environments within which the application may be executed.

Figure 1:
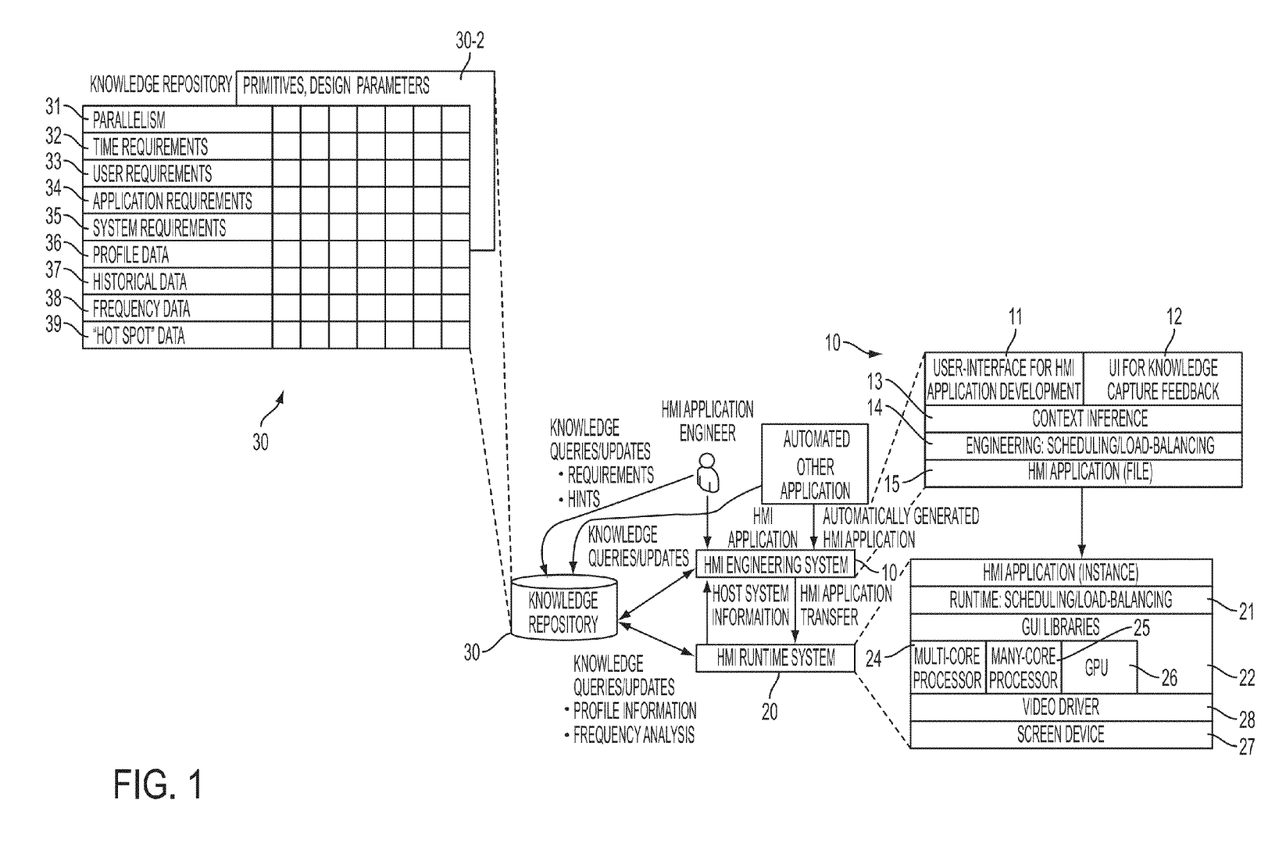
FIG. 1 is a diagram of an architecture for implementing the execution of HMI applications in a heterogeneous computing environment in accordance with the present invention.

FIG. 1 is a diagram of an architecture for implementing the execution of HMI applications in a heterogeneous computing environment in accordance with the present invention. The system architecture comprises three main elements: an HMI engineering system 10, an HMI runtime system 20 and a knowledge repository 30. As will be discussed in detail below, the creation and utilization of knowledge repository 30 is a key component in implementing HMI application execution in a heterogeneous multiprocessor system in accordance with the present invention. The utilization of a separate, dedicated HMI engineering system 10 is intended to permit application developers to focus on the specific design of an HMI application without needing to know or worry about any system-dependent constraints (e.g., specifications and details regarding components such as memory, hardware-accelerated libraries, CPUs, GPUs, etc.) that are properly concern of HMI runtime system 20.

While an HMI application developer may not be experienced in the actual engineering involved in creating an executable program, he/she may indeed have useful information in the form of system requirements and other "hints" that may be useful in the engineering process. Heretofore, this information would not necessarily be communicated to the other organizations used to actually create the executable code for the HMI application. In accordance with the present invention, this developer-based information is transferred to, and retained within knowledge repository 30. This information may also be directly transmitted to HMI runtime system 20 as part of the information delivered with the application file sent from HMI engineering system 10 to runtime system 20. At later points in the process, the engineers involved in other aspects of the HMI system will be able to access knowledge repository 30 and use this information.

HMI engineering system 10 functions to understand the system-level requirements defined by the application developer and create a set of real-time execution requirements for a specific HMI system being used (which may be a low-end HMI system, a high-end HMI system, or some other type of arrangement). These specific details are provided by runtime system 20 to engineering system 10 in the form of "host system information", as shown in FIG. 1.

HMI runtime system 20 is particularly configured, as described in detail below, to provide for effective use of heterogeneous multiprocessors and thus reduce the overall execution time of an HMI application, balancing the workload and scheduling the computations across the various computing elements forming the given set of heterogeneous resources.

In accordance with the present invention, HMI engineering system 10 and HMI runtime system 20 work in conjunction with information obtained from knowledge repository 30 to find an optimum way to execute the application in heterogeneous computing elements while minimizing the response time and complying with the real-time application requirements. HMI runtime system 20 is configured to instantiate the application transferred by HMI engineering system 10, executing the application in the available hardware and network resources. System 20 needs to be able to interpret the received knowledge annotations and make effective use of these annotations to perform load balancing and scheduling of the application across the multiple resources. As described below, both static and dynamic scheduling and load balancing are considered. The job of an HMI runtime system 20 is to be the manager of the hardware resources and to administer in such a way that the application is executed as fast as possible and comply with the definitive real-time requirements.

Additionally, HMI runtime system 20 manages and maintains control of the following elements: (1) the computation units available in the current system (these can include multi-core processors, many-core processors, GPUs, digital signal processors (DSPs), sensors, actuators, programmable logic controllers (PLCs), application-specific integrated circuits (ASICs), field-programmable gate arrays (FPGAs), and any other device capable of performing computation of data; (2) the interconnection networks between these various computation units; (3) the GUI libraries; and (4) the access to video drivers and screen devices. HMI runtime system 20 also maintains and monitors the state of execution of the application as a function of time. This state of execution information is then used to update Knowledge Repository 30 with profile information, frequency analysis, and the like.

In particular, HMI runtime system 20 is responsible for partitioning the application into data-independent fragments that are executed in the available hardware and network resources in such a way that the execution time, response time, load balance, resource utilization, power consumption, heat distribution, fault tolerance, error handling and any other desirable metrics are optimized.

Referring to the details of FIG. 1, HMI engineering system 10 is shown as including a first interface component 11 that is accessible by the developer and is used to import the original application concepts to HMI engineering system 10. System 10 may transmit requests and other prompts back to the developer via interface 11. A second interface 12 is included within HMI engineering system 10 and is shown as creating a communication path between HMI engineering system 10 and knowledge repository 30. Queries may be sent from HMI engineering system 10 to repository 30, requesting information useful for the engineering aspects of developing an HMI application such as, for example, specific primitives that may permit parallelization, use of hardware accelerators, or the like. These various operations of knowledge repository 30 will be described in detail below in association with the flowcharts of FIGS. 2 and 3.

Continuing with the description of HMI engineering system 10, a context inference module 13 functions to receive and review host system information from the associated HMI runtime system 20. This host system information includes elements such as: the number of processors in the specific system being used in this case to execute the HMI application, the number of cores per each processor, the number of GPUs in the system, specifications about processing elements (such as cache memory organization), number and type of automation elements in the system (e.g., PLCs, other HMI devices, sensors, actuators, etc.), performance characterization of each computation element in the system, interconnection network information (e.g., latency, bandwidth, type of protocols, etc.), availability of GUI libraries that are accelerated or "tuned" for specific hardware components, current workload and distribution of workload in the system, and—if an HMI application is running—the performance characterization of the application.

Based on all of this information, an engineering module 14 within system 10 develops a multiprocessor schedule for the HMI application, including execution rules for use by HMI runtime system 20 regarding the specific HMI functionalities that can take advantage of parallelization, accelerated libraries, and the like.

Upon finalization of HMI application engineering process, the application file 15 is transferred from HMI engineering system 10 to HMI runtime system 20, which assesses the available computational and network resources, as well as libraries that may be available to accelerate certain ones of the identified primitives. The details of an exemplary HMI runtime system 20 are shown in FIG. 1 as including a runtime module 21, that provides scheduling and load balancing of the HMI application file appearing as an "instance" within HMI runtime system 20. GUI libraries 22 within HMI runtime system 20 function in association with an exemplary multi-core processor 24, many-core processor 25 and a GPU 26 to present selected HMI elements to a screen device 27 via a video driver interface 28.

As with HMI engineering system 10, HMI runtime system 20 interacts with knowledge repository 30 to obtain information in response to specific queries, as well as to update knowledge repository 30 with feedback "learned" during runtime (e.g., profile data, frequency analysis, performance characterization of the system, and the like).

In accordance with the present invention, knowledge repository 30 is configured to interact with both HMI engineering system 10 and HMI runtime system 20 through queries and updates, classifying the "knowledge" stored therein according to different criteria. One exemplary organization of the stored knowledge is shown in FIG. 1, which illustrates knowledge repository 30 as comprising the following partitions: a parallelism capabilities partition 31, a time requirements partition 32, a user requirements partition 33, an application requirements partition 34, a system requirements partition 35, a profile data partition 36, a historical data partition 37, a frequency data partition 38 and a hotspot data partition 39. It is to be understood that this specific organization of partitions is exemplary only, various other organizations of the knowledge elements may be used and better-suited for other specific applications.

It is an important aspect of the present invention that knowledge repository 30 is de-coupled from both HMI engineering system 10 and HMI runtime system 20. By operating as an independent entity, knowledge repository 30 is not limited to the architectures and/or capabilities of the specific hardware and software elements of the various systems within which HMI applications are executed. Indeed, it is contemplated that knowledge repository 30 will be developed in a manner that allows for it to interact with multiple, different engineering and runtime systems, continuing to dispense and receive information to build a robust repository that is continuously updated and available for use in various heterogeneous multiprocessor environments.

Knowledge repository 30 is also configured to retain design patterns for use by HMI engineering system 10 and HMI runtime system 20, shown as section 30-2 of knowledge repository 30 in FIG. 1. For example, basic operations of HMI runtime system 20, such as TCP/IP implementation, can be annotated with specific execution details and stored in knowledge repository 30 (i.e., in a "parallelization" portion) so that the runtime system can take advantage of the parallelization framework. Therefore, in circumstances where the HMI runtime system is executed in a low-end HMI device, this knowledge regarding the parallelization capabilities of the TCP/IP implementation can be used by the HMI runtime system kernel to schedule system-level operations using this same parallelization framework. Similarly, HMI engineering system 10 can take advantage of this feature to parallelize the system-level engineering tasks (e.g., multi-threading and parallelizing the user interface).

With this understanding of the system architecture of the present invention, an exemplary process for developing and efficiently executing an HMI application in a heterogeneous environment will be discussed in detail below in association with the flowcharts shown in FIGS. 2-4.

An HMI application is first created by an application developer (human or automated) to enable a specific function or set of functions to be performance by an HMI device. The details of the specific HMI application are not germane to the subject matter of the present invention, which is instead viewing the process at the higher level of providing a system, method and program for developing and executing these HMI applications in a heterogeneous environment, regards of the particular functionality of a given application.

In most cases, the application creation process begins (shown as step 200) with the developer selecting one or more elements from a library of HMI elements (HMI elements being defined as industrial control system-based monitoring functions, alarms, sensors, actuators and the like). In a visual programming environment, any desired HMI element (pressure value, temp sensor, alarm, etc.) is "cut-and-pasted", dragged or otherwise placed on a screen. Code for implementation of each element is then associated with its visual representation, as shown in step 205.

In accordance with the present invention, the application developer has the ability to provide additional helpful information (hints) or requirements for each HMI element placed on the HMI application (step 210), storing this information in association with its related HMI element in knowledge repository 30 (step 215). For example, if an HMI element is placed in a screen to provide a video feed, the developer can create notations such as: "video processing is a CPU-intensive application that can take advantage of specialized signal processing libraries" and/or "video processing contains high amounts of parallelism". These notations are then stored in knowledge repository 30 in a linked relationship with the specific video feed element.

In another example, when an HMI element representing an alarm is placed on the screen, the developer can create a notation that "this alarm element should be processed with the highest priority—related to a safety-critical operation of the system". Other examples include real-time requirements such as "this operation must be completed in less than 50 ms", or design experience such as "this operation will rarely occur". The HMI application itself and associated knowledge (as known by the developer) are then also stored in knowledge repository 30 (step 220). The specifics of knowledge repository 30 are described hereinafter in association with the flowchart of FIG. 3.

Figure 2:
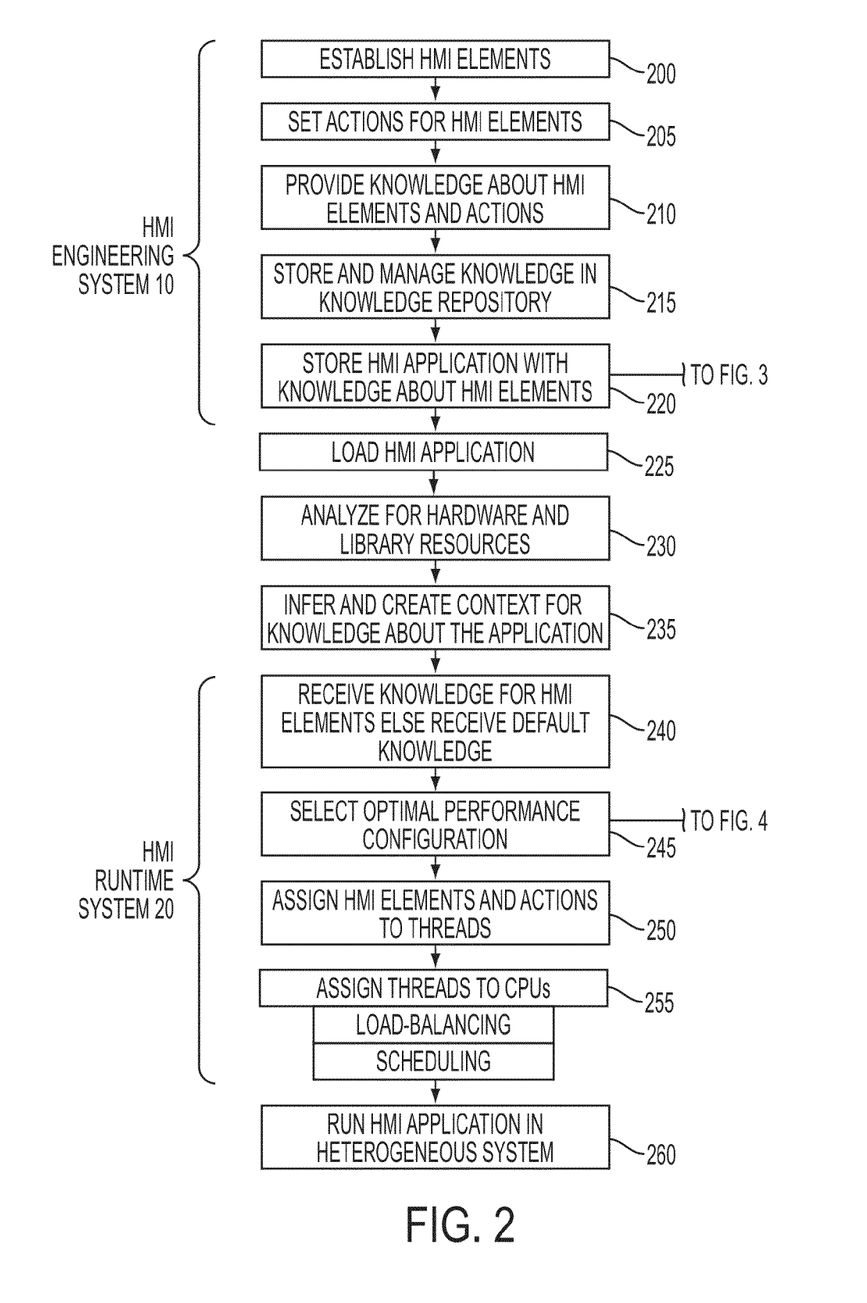
FIG. 2 contains a flowchart of an exemplary process for executing HMI applications in a heterogeneous environment in accordance with the present invention.

Continuing with the description of the process as outlined in FIG. 2, the HMI application as created by the developer is then loaded into HMI engineering system 10 (step 225). HMI engineering system 10 then begins to analyze the HMI elements forming this application (step 230), and also query knowledge repository 30 for additional information about specific HMI elements, as well as update the records of knowledge repository 30 with respect to these HMI element. FIG. 3 contains a flowchart illustrating an exemplary process that may be utilized by HMI engineering system 10 to retrieve information regarding the various HMI elements currently included in the application being developed, and will be described in detail hereinbelow.

Once HMI engineering system 10 has retrieved all of the known information from knowledge repository 30, the specific host system information from HMI runtime system 20 is considered (step 235) and used to create a specific "context" for this HMI application.

HMI engineering system 10 then creates a specific HMI application file and transfers all of this information to HMI runtime system 20 (step 240). This transfer must include the knowledge annotations that are necessary for HMI runtime system 20 to execute the application in the most effective manner. There are three different situations in which this transfer occurs: (1) HMI runtime system 20 is not running and no applications are active; (2) HMI runtime system 20 is running, and a different application is active; and (3) HMI runtime system 20 is running and the same application as the one being transferred is already active.

Figure 4:
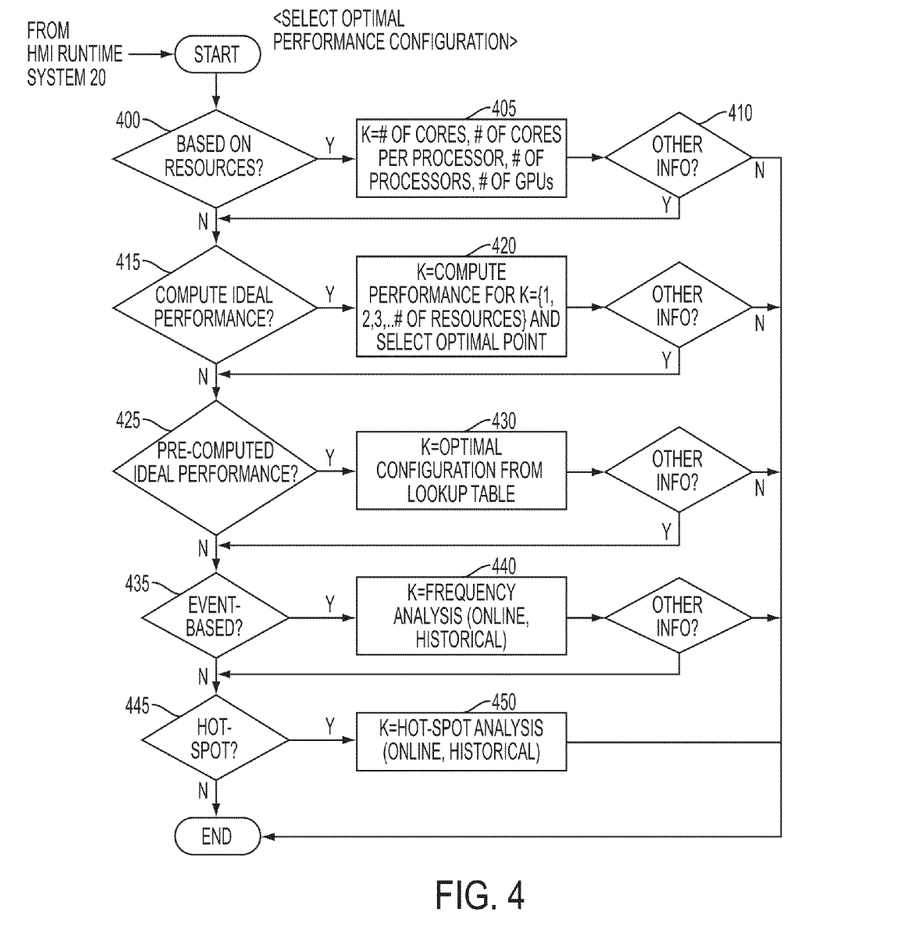
FIG. 4 is a flowchart of an exemplary process used to estimate the optimal performance configuration of an HMI application in a heterogeneous system environment.

One of the most important steps in the process is to estimate the optimal performance configuration of the application in the heterogeneous system, identified as step 245 in the flowchart of FIG. 2 and shown in detail in the flowchart of FIG. 4. The ideal performance step determines, based on various metrics, the best way to utilize the resources of the execution of the HMI application. The ideal performance configuration may be computed prior to the execution of the application, during the execution of the application, or even after the execution of the application. The ideal performance configuration can be compared against the actual performance, with this information then stored in knowledge repository 30 for future reference in developing an execution plan for another application.

Once the optical performance configuration is selected as determined in step 245, HMI runtime system 20 proceeds with assigning different ones of the HMI elements and actions to different threads (step 250), based upon the specific number and capacity of the cores, GPUs, and the like available to efficiently execute the HMI application in the specific hardware configuration. The developed threads are then assigned to the CPUs in a manner that best provides load balancing and scheduling between data-independent program fragments (step 255). The HMI application is then executed (step 260), where runtime data in terms of profile information and frequency analysis can be passed from HMI runtime system to knowledge repository 30 during execution.

As mentioned above, FIG. 3 contains a flowchart illustrating an exemplary process that may be utilized by HMI engineering system 10 to retrieve information regarding the various HMI elements currently included in the application being developed. The query process as shown in FIG. 3 is performed on an element-by-element basis—other arrangements for obtaining information may be used as well. As shown, the process begins with a query to determine if the application developer (referred to as 'user') has stored any information that is useful for the engineering process (step 300). If developer information is found, this information is returned to HMI engineering system 10 (step 305) and the process moves to the next query (step 310). If there is no developer information associated with the current HMI element, the process also moves to this next query at step 310, which in this case is a query to determine if the original HMI application was an automatically generated application (as opposed to created by a developer). As mentioned above, a particular HMI application may be created ab initio by an applications engineer, or take the form of a previously-created application which is being re-used for the current task.

If the application was automatically generated, information related to the information that was previously stored in knowledge repository 30 is retrieved and sent to HMI engineering system 10 (step 315). The following query is to search knowledge repository 30 for any historic data (step 320), which is considered to include any information developed from prior executions of the same HMI element, where this data is also passed to HMI engineering system 10 (step 325). Any runtime data that may be available (query in step 330) is similarly communicated to HMI engineering system 10 (step 335). Closely related to runtime data is "frequency data" (associated with the following query in step 340), which is information gained by analyzing utilization patterns of various HMI elements and actions over time. For example, if it is determined that a particular element is frequently "called" for use, yet takes a relatively long time to execute, this element could be flagged as "hot spot" where a program could bog down during execution. This type of frequency information is often very useful for the engineering system in developing the particulars of the HMI application. By default, if knowledge repository 30 does not contain any other information (i.e., if the response to each of these queries has been in the negative), dataflow and control analysis information remains available and is returned to HMI engineering system 10 (step 350).

Figure 3:
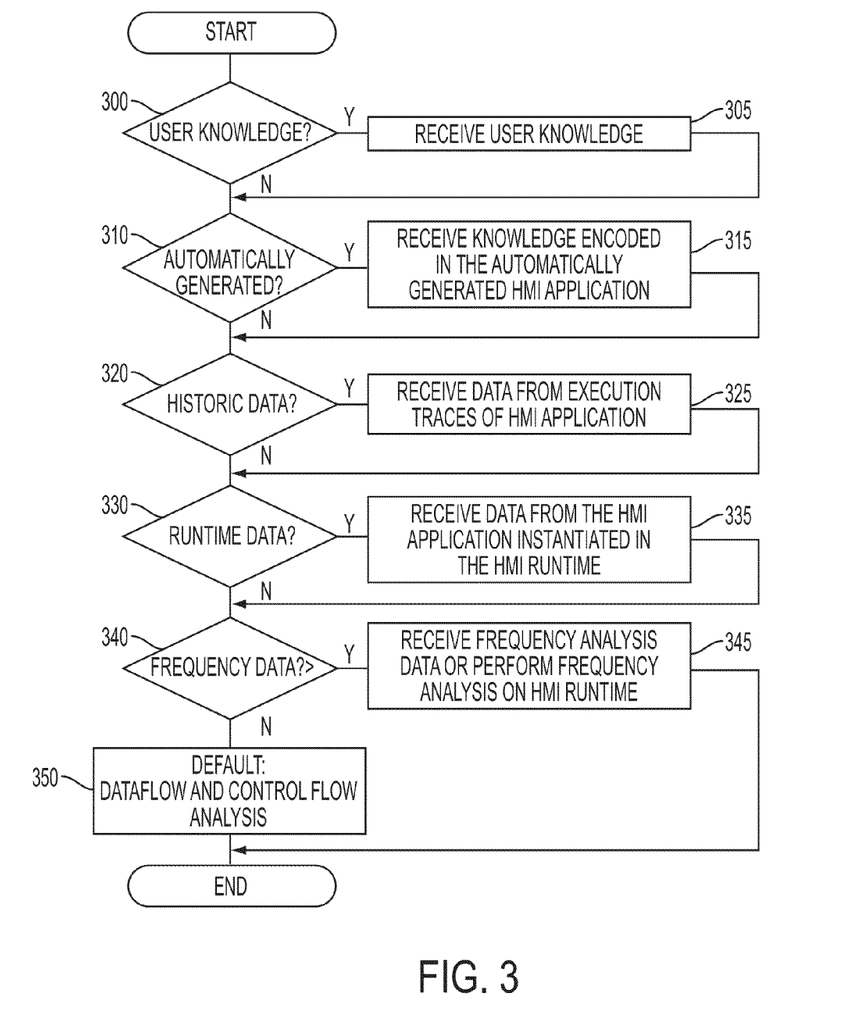
FIG. 3 is a flowchart showing exemplary interactions with a knowledge repository during the process as outlined in FIG. 2.

There are several scenarios where "query/update" communications between HMI engineering system 10 and knowledge repository 30 are possible, where each of these scenarios would employ the steps as outlined above and shown in the flowchart of FIG. 3.

For example, in one situation the developer provides HMI engineering system 10 with only the HMI elements and actions to be performed by these elements—no other specific knowledge is provided by the developer. In this case, HMI engineering system 10 will query knowledge repository 30 to see if there is any other knowledge available for each one of the defined HMI elements and actions.

Alternatively, the developer may provide some additional knowledge for a few of the HMI elements in the application, but many elements are submitted with no additional information. HMI engineering system 10 would then interact with knowledge repository 30 to first update any information pertinent to the knowledge it received, while also launching a query for information on the remaining elements for which no additional information was supplied by the developer.

It may also be possible that some "new" information submitted by the developer is erroneous. In this case, HMI engineering system 10 must manage the erroneous information and replace it with the most appropriate selection from knowledge repository 30. In one embodiment, the erroneous information may thereafter be stored in knowledge repository 30, but flagged as "erroneous", "unreliable", or a similar qualifier. This information may be used in latter stages of system development to fine-tune the design of HMI engineering system 10, HMI runtime system 20 or used to provide guidance to a developer of a new HMI application.

In the situation where an HMI application is automatically created, HMI engineering system 10 should evaluate any new knowledge submitted with the application, override erroneous knowledge, or provide the default knowledge for the defined HMI elements and actions. An interesting feature for automatically-generated HMI applications is the ability to use knowledge about the elements to fine-tune the design. For example, input from knowledge repository 30 can be used by the automated developer to find the most appropriate absolute and relative position of the HMI elements and actions.

As mentioned above, one of the most important steps in the HMI application creation process involves estimating the optimal performance configuration of the application in the heterogeneous system. This step is referred to as step 245, and is shown in detail in the flowchart of FIG. 4. Referring to FIG. 4, one methodology used to calculate the ideal performance configuration takes into consideration one or more of a set of criteria related to certain measures that may be analyzed to quantify the efficiency of the application's execution.

It is to be understood that in this case "one or more" is considered to define situations where the ideal performance configuration uses only one of the measures, two of these measures, or any other subset of measures (including all of the measures). In the flowchart of FIG. 4, a first query 400 asks if the optimal performance configuration will be "based on the resources of this HMI system that will be running the HMI application". If indeed the resources are to be used (i.e., a positive response to query 400), the process moves to step 405 to determine quantifiers such the number of cores, number of processors, domain-specific hardware and GPUs and the like, taking into consideration the latencies and capabilities of both the computation elements and the network interconnecting these elements.

At this point, a decision is made if other criteria are to be considered (step 410). If the response is "no", an optimal performance configuration result is determined based on this resource information and returned to the process shown in the flowchart of FIG. 2. On the other hand, if other criteria are to be considered, the output from decision step 410 moves to query step 415. As shown in FIG. 4, a "no" output from the original query with respect to studying available resources will also move to query step 415. Defined as "compute ideal performance", this approach is a brute-force approach to determining the optimal performance configuration (which may be time consuming). The "brute force" approach (as shown in step 420) creates different configurations and executes the HMI application until the configuration that leads to the shortest execution and cycle time (or the optimization criteria under consideration) is found.

Again, a check is made (step 410) to determine if any other criteria are to be considered, where either the process ends, or it moves to the next query—shown in step 425 as a pre-calculation approach that utilizes a look-up table that characterizes the performance of the application according to various performance metrics. If this metric-based method is selected (step 430), HMI runtime system 30 functions to choose a good approximation for the ideal configuration. At this point, the process again passes through check step 410 and either ends or continues to the next query at step 435. In this case, the optimal performance criteria is defined as an event-based estimation that takes into account the frequency of events to which the application must respond, where these events include user events, network events, sensor/actuator events, interrupts, etc. (step 440).

The last criteria shown in FIG. 4 that is an exemplary methodology for determine an optimal performance configuration is defined as "hot spot"-based estimation (step 445), which refers to the characterization of the fragments of the program that consume the most resources. Identifying these fragments is very useful for optimization. For example, if the hot spot is in floating-point calculations, that program fragment can be off-loaded from a CPU to a GPU where floating-point calculations can be executed in parallel.

In any alternative, the results of the optimal performance configuration process of FIG. 4 are returned to step 245 of the system flowchart as shown in FIG. 2, where HMI runtime systems 20 uses this configuration information to assign tasks in an optimum arrangement.

Figure 5:
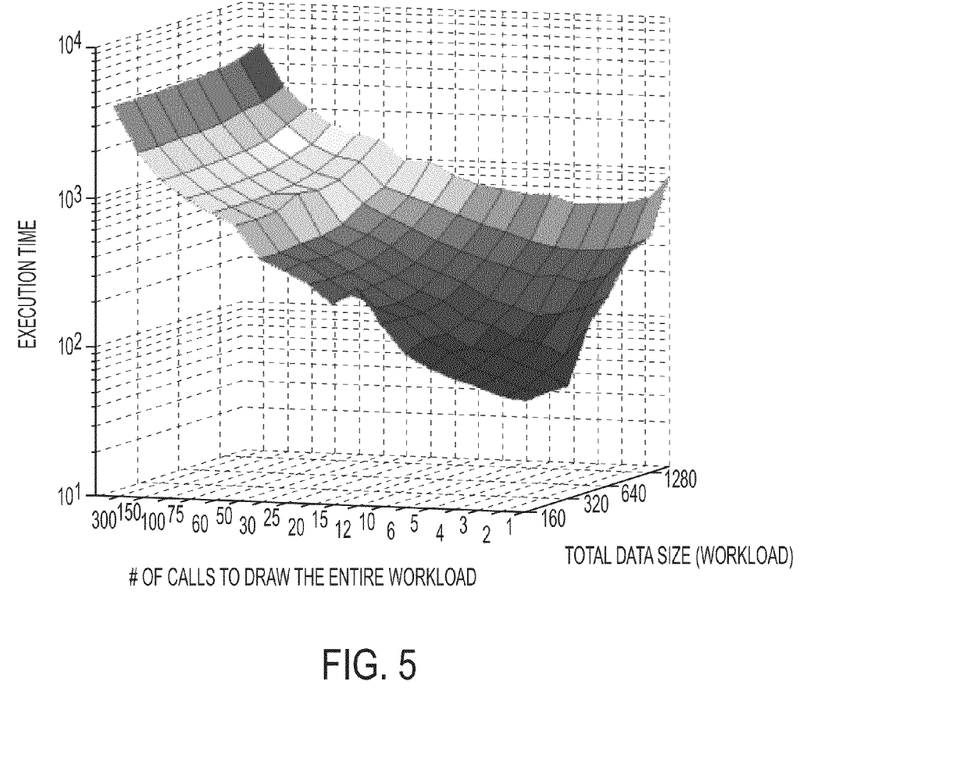
FIG. 5 is a graph of one exemplary configuration calculation based on ideal performance.

FIG. 5 is a graph of one exemplary configuration calculation based on ideal performance. This graph characterizes the execution time of an HMI application according to the workload (i.e., the total data size that must be rendered) and the number of calls that are required to draw the entire workload. Using this particular characterization as shown in FIG. 5, for any given workload between the values of 160 and 1280, the optimal point for balancing the number of calls for drawing that workload can be found. This analysis determines the best way to divide the workload into the available resources and obtain execution of the entire application in the shortest amount of time (or any other performance metric).

Figure 6:
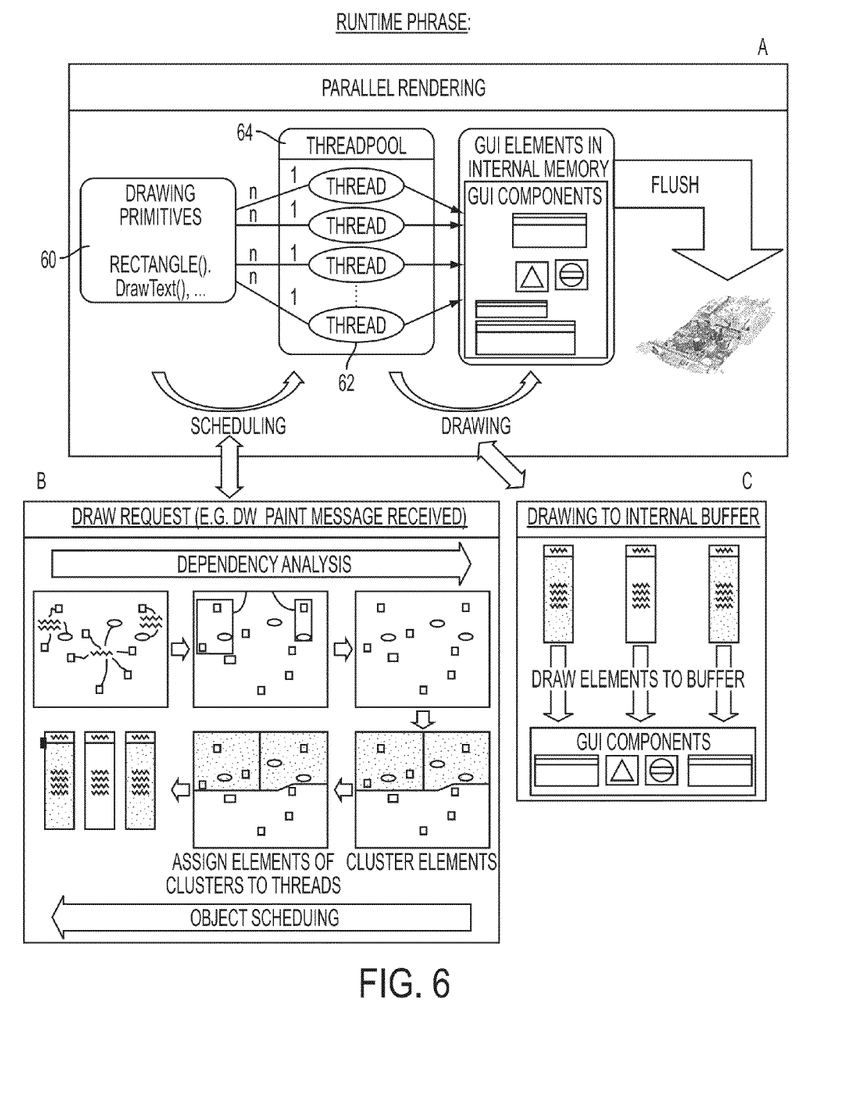
FIG. 6 illustrates an implementation of the method of the present invention, particularly showing a parallel rendering of an exemplary HMI runtime system.

FIG. 6 illustrates an implementation of the method of the present invention, particularly showing a parallel rendering of HMI runtime system 20. A GUI application has drawing primitives 60 as key functional actions behind GUI objects, as shown in Block A of FIG. 6. To parallelize these actions, primitives 60 are assigned to different threads 62 from a threadpool 64. This assignment necessarily into account the independent or dependent nature of these primitives 60, which is determined using the strategy as shown in Block B. As shown, Block B includes an analysis of primitives 60 and detects any dependent objects. After dependent objects are detected, the process as shown in Block B groups dependent objects together and thereafter handles them as a single "object". This grouping assures that the primitives will not be split apart, and will be assigned to the same thread.

Once the dependencies are identified and the dependent primitives grouped together, a clustering step is performed, which groups the independent primitives in an optimal way (i.e., based on criteria such as equal number of elements per thread, size of elements per thread, approximated computation per element, etc.) and assigns the groups to threads (identified above as step 250 in the flowchart of FIG. 2). These threads can now execute concurrently without any dependency on each other, as shown in Block C of FIG. 6. In this specific implementation, the drawing and rendering of the GUI elements takes place in an internal memory buffer.

Figure 7:
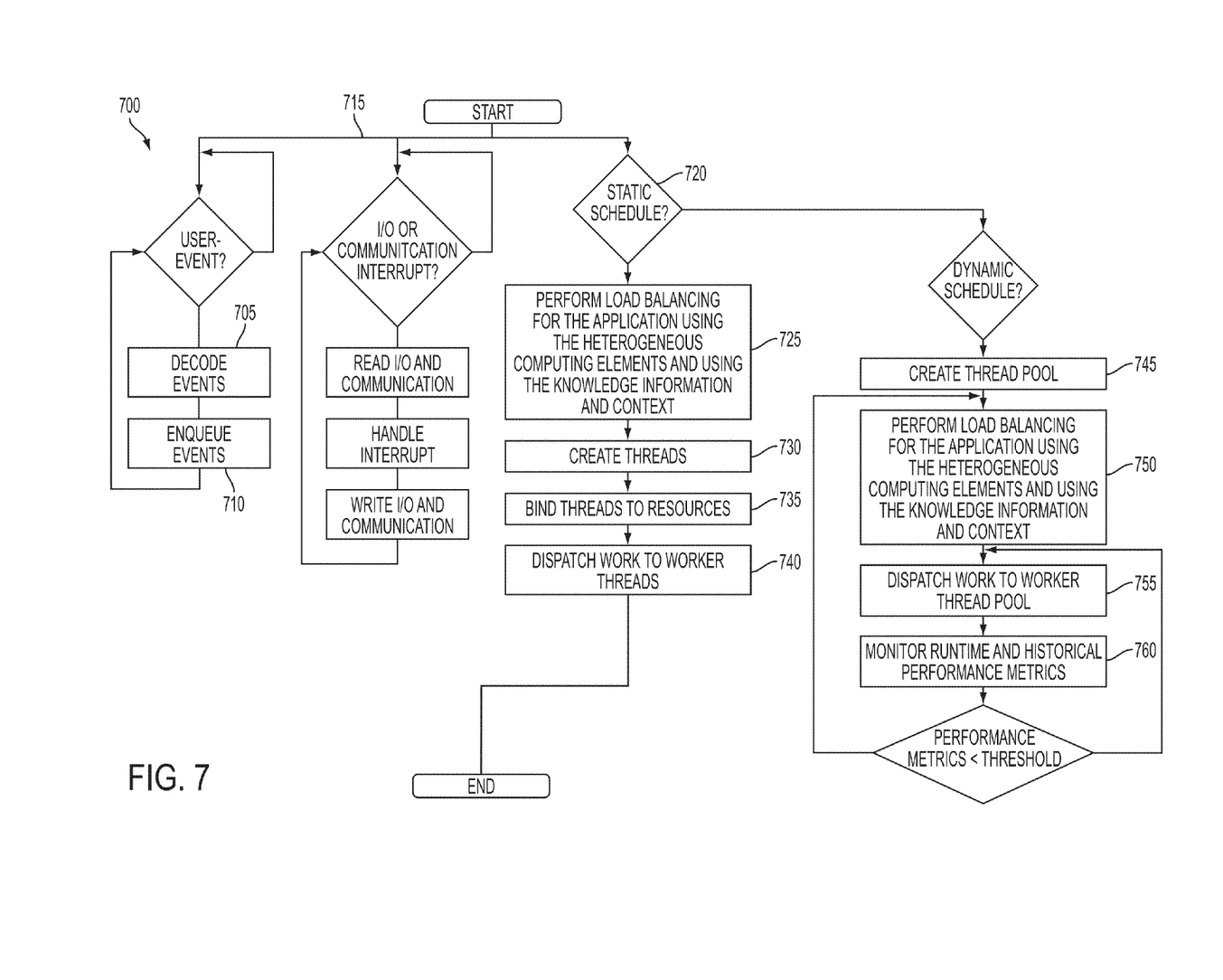
FIG. 7 is a flowchart illustrating an exemplary implementation of the HMI runtime system as shown in FIG. 6.

FIG. 7 is a flowchart illustrating an exemplary implementation of HMI runtime system 20. A first loop 700 is defined as a user-event loop for handling all user-trigger events. These events are decoded in step 705 and then enqueued 710 in a GUI event queue for processing by the worker threads that handle the execution of GUI elements and their associated actions. A second loop 715 is defined as an I/O loop (also referred to at times as a communication interrupt loop) and handles all of the communications associated with HMI runtime system 20. The interrupt handling may enqueue events if actions by the worker threads or system-level threads are necessary. The final branch 720 shown in the process of FIG. 7 is a scheduling branch, which first determines if static or dynamic scheduling is required. If the decision is made to proceed with static scheduling, the processing moves to step 725, which performs a one-time load balancing and scheduling of events across the heterogeneous computation elements. The threads are created (step 730), associated with the processing resources (step 735) and the initial work is dispatched to the worker threads (step 740).

The runtime performance is monitored by a separate thread (not shown) and if the current performance does not meet a set of predetermined performance requirements, a rescheduling is executed and the monitoring cycle is used to detect any anomalies in the execution or, alternatively, concludes that the performance metrics are being met and the process can continue.

If the application is instead determined to require dynamic scheduling, a thread pool is created (step 745) and first performance loop is begun, including load balancing and schedule (step 750), dispatching of work (step 755) and monitoring of the performance of this execution (step 760). If the performance metrics are satisfied in this first loop, the program circles back to step 755 to continue to dispatch work (if other assignments are remaining) Alternatively, if the performance is less than satisfactory, the process returns to step 750 to attempt a different configuration for load balancing and scheduling.

It is to be understood that the various heterogeneous resources as used to implement the functionality of the present invention may be implemented in various forms of hardware, software, firmware, special-purpose processors, general-purpose processors, or any combination thereof. Some embodiments are implemented in software as a program tangibly embodied on a non-transitory program storage device. By implementing with a system or program, assignment of elements and/or actions for parallel processing in different threads may be provided as part of the creation of the HMI application.

Indeed, components such as a processor and/or memory may be part of a computer, personal computer, server, workstation, network processor, or other now-known or later-developed processing system. Various peripheral devices such as, for example, a display, a disk storage device, keyboard, or the like may be coupled to a processor. A program may be uploaded in, and executed by, a processor comprising any suitable architecture.

The instructions, user input, rules, and/or other information are stored in a non-transitory computer readable memory, which may be an external memory or a member element embedded within a computer. The instructions for implementing the processes, methods and/or techniques discussed herein are provided on computer-readable stored media or memories, such as a cache, buffer, RAM, removable media, hard drive or other computer-readable storage media. The functions, acts or tasks illustrated in the figures or described herein are executed in response to one or more sets of instructions stored in or on computer-readable storage media. The functions, acts or tasks are independent of the particular type of instruction set, storage media, processor or processing strategy and may be performed by software, hardware, integrated circuits, firmware, micro-code and the like, operating alone or in combination.

Indeed, various improvements described herein may be used together or separately. Although illustrative embodiments of the present invention have been described herein with reference to the accompanying drawings, it is to be understood that the invention is not limited to those precise embodiments, and that various other changes and modifications may be affected herein by one skilled in the art without departing from the scope or spirit of the contemplated invention.

What is claimed is:

1. A system for creating and executing human-machine interface (HMI) applications in various heterogeneous computing and communication environments, the system comprising:
    an engineering system for designing an HMI application based upon a library of known HMI elements;
    a runtime system for determining an optimum configuration for executing the HMI application designed by the engineering system; and
    an independent knowledge repository in communication with both the engineering system and the runtime system, the independent knowledge repository for interacting with multiple, different engineering and runtime systems in various heterogeneous computing and communication environments and storing information related to various ones of the known HMI elements, as well as information created by application developers and information generated during execution of an HMI application by the runtime system, the independent knowledge repository interacting with the engineering system for updating information regarding selected elements and interacting with the runtime system to collect execution information for use in subsequent application developments utilizing multiple, different engineering and runtime systems;
    wherein the runtime system functions to assess the available computation and network resources available for processing the HMI application designed by the engineering system.

2. A system as defined in claim 1 wherein the engineering system gathers and encodes information including requirements, topology, configuration purpose, frequency and profiles to create an HMI application for a specific purse.

3. A system as defined in claim 1 wherein the engineering system creates execution rules for transmission to the runtime system with the created HMI application.

4. A system as defined in claim 1 wherein the runtime system functions to assess the libraries available to accelerate the execution of one or more primitive GUI operations included in the designed HMI application.

5. A system as defined in claim 1 wherein the runtime system collects profile data, frequency analysis and performance characterization information during execution and transfers this information to the knowledge repository.

6. A system as defined in claim 1 wherein the independent knowledge repository classifies the knowledge stored therein according to specific criteria associated with aspects of executing HMI applications in various heterogeneous computing and communication environments.

7. A system as defined in claim 6 wherein the specific criteria are selected from the group consisting of: parallelism, time requirements, user requirements, application requirements, system requirements, profile data, historical data, frequency data and hotspot data.

8. A system as defined in claim 1 wherein the independent knowledge repository further comprises a partition for storing frequently-used design patterns.

9. A method of creating and executing human-machine interface HMI applications in a heterogeneous computer and communication environment, the method comprising the steps of:

designing an HMI application based upon a library of known HMI elements utilizing an engineering design system;

determining an optimum configuration for executing the HMI application designed by the engineering system using a separate runtime system;

storing information in an independent knowledge repository that is de-coupled from, but in communication with, both the engineering system and the runtime system, the information related to various ones of the known HMI elements, as well as information created by application developers and information generated during execution of an HMI application by the runtime system; and updating the independent knowledge repository by interacting with the engineering system to update information regarding selected elements and by interacting with the runtime system to collect execution information for use in subsequent application developments in the various heterogeneous computing and communication environments;

wherein the runtime system functions to assess the available computation and network resources available for processing the HMI application designed by the engineering system.

* * * * *